Figure 1:
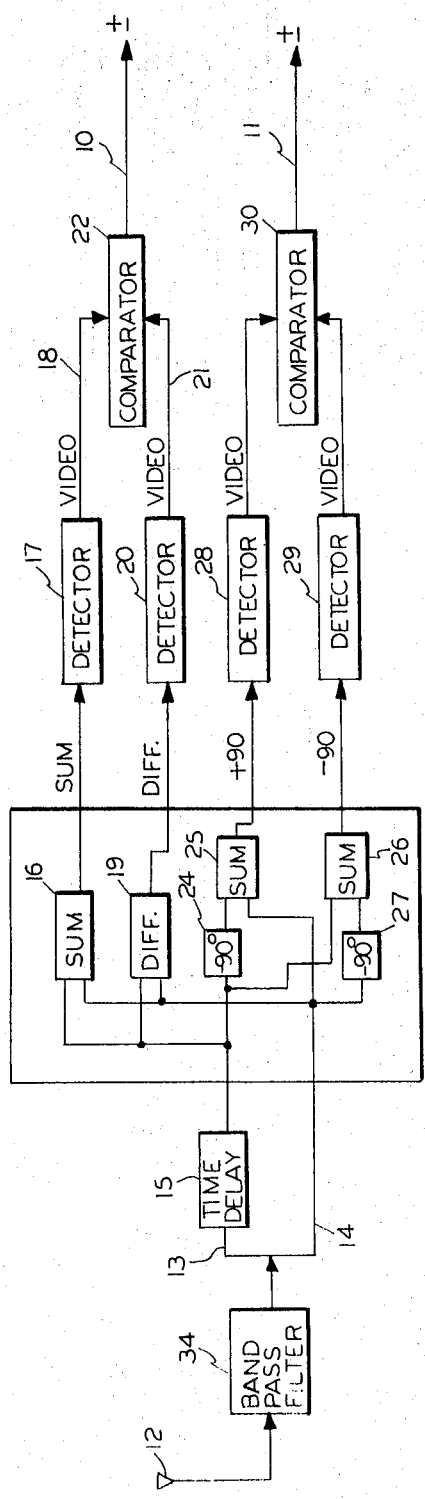

United States Patent

[11] 3,617,900

| [72] | Inventors | Charles Fink<br>Silver Spring;<br>Fred E. Burnham, Silver Spring; Maury I.<br>Marks, Bowie, all of Md. |
|---|---|---|
| [21] | Appl. No. | 555,858 |
| [22] | Filed | July 7, 1966 |
| [45] | Patented | Nov. 2, 1971 |
| [73] | Assignee | Litton Systems, Inc.<br>Silver Spring, Md. |

[54] DIGITAL FREQUENCY DETECTING SYSTEM
7 Claims, 5 Drawing Figs.

| [52] | U.S. Cl. | 324/82, 324/83 Q, 328/166 |
|---|---|---|
| [51] | Int. Cl. | G01r 23/12 |
| [50] | Field of Search | 324/82, 83 Q; 328/166 |

[56] References Cited
UNITED STATES PATENTS

| 2,994,037 | 7/1961 | Boyle, Jr. et al. | 324/83 Q |
| 3,189,820 | 6/1965 | Lowman | 324/82 |

*Primary Examiner*—Richard A. Farley
*Assistant Examiner*—Daniel C. Kaufman
*Attorneys*—Alfred B. Levine, Robert H. Lentz and Alan C. Rose ABSTRACT: A frequency measuring system having one or more channels each of which, has time delay means responsive to an input signal whose frequency is to be determined, and phase shifts such signal in proportion to its frequency. Each channel determines whether the signal frequency lies within a given frequency range by analyzing said phase shift to result in a digital indication of such frequency range. The signal is processed in as many different channels as desired, each channel determining a different frequency range. Each channel also includes resolution improving means for resolving ambiguity in the analysis of the phase shift therein.

INVENTORS
CHARLES FINK
FRED E. BURNHAM
MAURY I. MARKS

BY Alfred B Levine
ATTORNEY

DIGITAL FREQUENCY DETECTING SYSTEM

This invention pertains to an electronic system for very rapidly determining the frequency of an applied signal, in the form of a continuous wave or a discontinuance wave or pulse, and producing a digital code, such as a binary code, defining its frequency.

Very generally according to the invention there is provided a system having one or more channels, preferably operating in parallel or simultaneously on the incoming signal, and in each channel, the signal is processed to determine whether or not its frequency lies within a different given frequency range, which range is progressively narrowed or diminished in the different channels. Therefore, in a first or highest order channel it is determined that the unknown frequency resides within a first broad frequency range and a digital indication of that range is produced. In a second and additional channels, this frequency range is progressively narrowed or reduced and less significant digits of the code are produced identifying the frequency with greater resolution.

In each channel, the determination of frequency range is made by applying the signal to a frequency sensitive but fixed delay line, or other time delay means, and comparing the amplitudes of the sum and difference of the delayed signal and the original signal, as well as comparing the amplitudes of various phase shifted versions of the delayed signal and the original signal. Since the phase delay produced by the delay line varies at different frequencies, the sum and difference amplitudes likewise vary with frequency; and by means of the amplitude comparisons the location of the signal within given frequency ranges can be obtained.

Each channel employs a different fixed time delay which is made progressively longer in the different channels to accentuate the phase shift produced with change in frequency and therefore progressively narrow the frequency range. Consequently, the greater number of channels being used, the more precisely the frequency of the incoming signals can be obtained.

All of the comparisons are preferably performed simultaneously so that an incoming signal in the form of either a continuous wave or a pulse can be analyzed almost instantaneously and an output code can be produced representing the frequency of the signal.

One of the significant features of the invention is that the system lends itself to construction in modular form with each module containing all of the necessary circuits for a single channel, and with each channel being substantially identical with the others excepting for the time delay cable or delay line being used. The system is therefore quite versatile and a greater or lesser number of modules can be combined as may be desired to provide greater accuracy or resolution, wider frequency bandwidth, or any combination of these features as might be desired for a particular application.

Another significant feature of the invention is the fact that with but a few modules, sufficient excess information or redundancies can be obtained to resolve any ambiguities that might otherwise occur and create error in the output code.

It is accordingly a principal object of the invention to provide a very rapidly operating frequency detector that defines the frequency directly in a digital code.

A further object is to provide such a system that substantially eliminates ambiguities in the code.

Another object is to provide such a system that is very versatile and that lends itself to construction in modular units, whereby a greater or lesser number of modules may be assembled to provide systems of different bandwidth, accuracy, or resolution, as might be desired.

A still further object is to provide such a system that is capable of responding directly to radio frequencies in the form of pulses or continuous waves and very rapidly defining the frequency in the form of a digital code.

Figure 2:
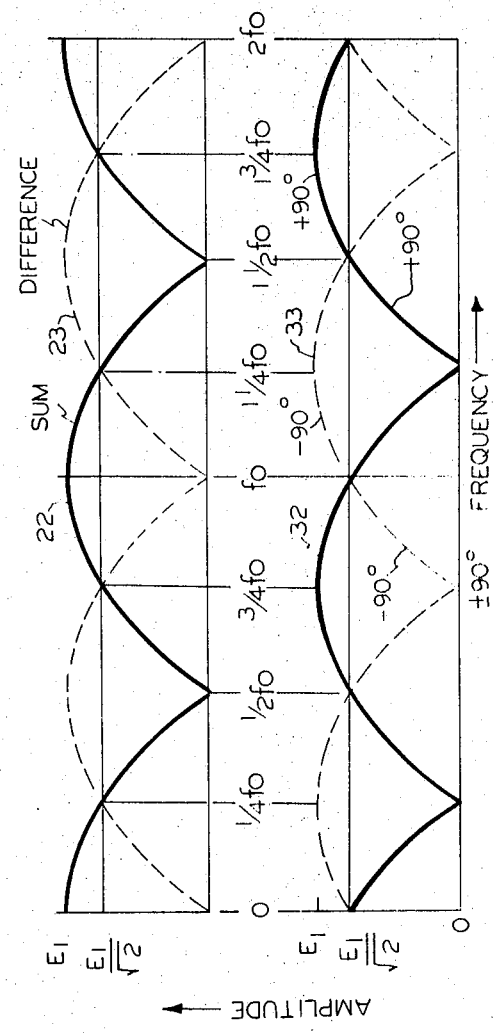
Figure 3:
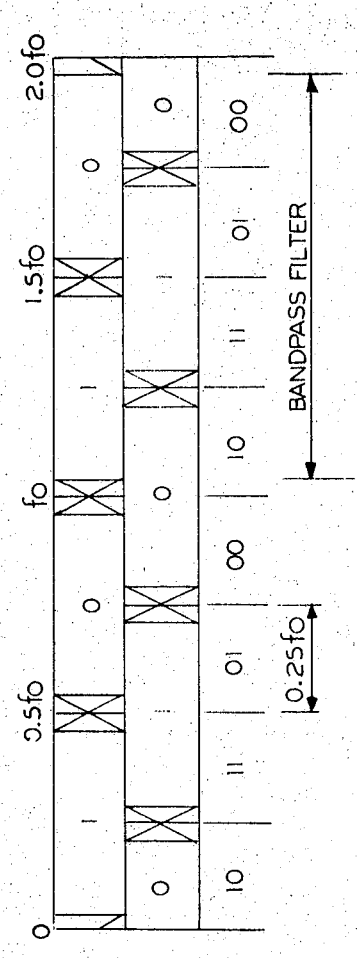
Figure 4:
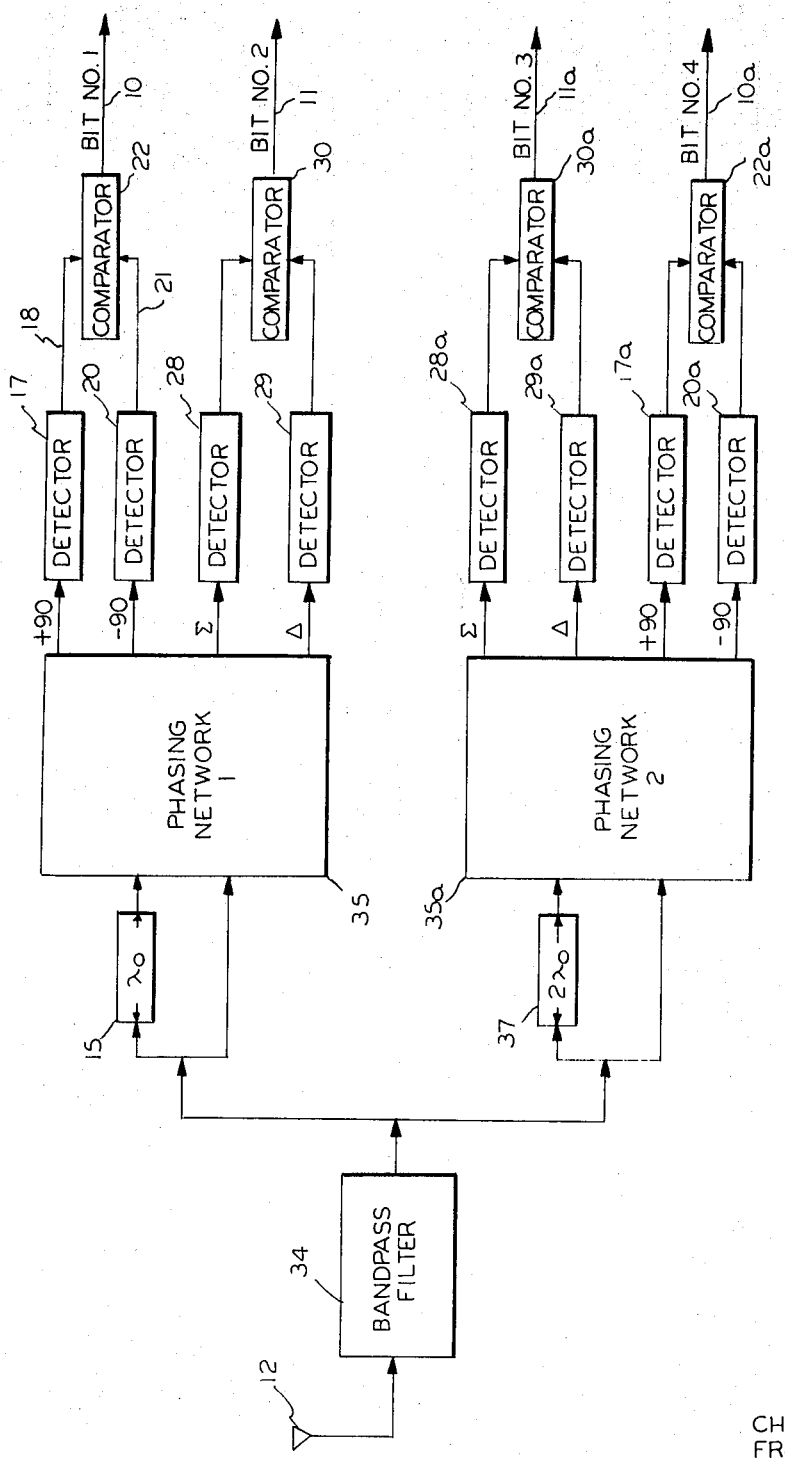

Other objects and many additional advantages will be more readily understood by those skilled in the art after a detailed consideration of the following specification taken with the accompanying drawings wherein:

FIG. 1 is a block-type diagram illustrating one preferred construction of a single channel according to the present invention, FIG. 2 is a waveform chart for illustrating the manner of operation of the channel of FIG. 1, FIG. 3 is a digital decision diagram derived from the waveform diagram of FIG. 2, FIG. 4 is a block diagram similar to FIG. 1 and illustrating a two-channel system according to the invention producing a four-bit digital code, and FIG. 5 is a decision diagram, similar to that of FIG. 3, for illustrating the operation of FIG. 4.

Referring to the drawings for a detailed consideration of one preferred manner of practicing the invention, there is shown in FIG. 1 a single module or channel according to the invention for producing a two-digit binary code over output lines 10 and 11 that define or represent the frequency of an incoming radio frequency signal received at antenna 12. Initially, the incoming RF signal whose frequency is to be determined may be suitably amplified (not shown) and thence applied over transmission lines 13 and 14 to the module. Over the first transmission line 13, the signal is passed through a fixed time delay cable 15, which may be merely a cable of greater length than that of line 14, to produce an additional phase shift in the signal that is not experienced over line 14.

It will be appreciated that by using a delay line or cable, the phase shift produced in the signal will linearly vary with frequency such that if the frequency is twice as great, for example, the phase shift produced will be doubled.

After being phase shifted, this signal and the original RF signal over line 14 are applied to a summing circuit 16 where these two signals are added, and the sum signal is applied to a detector 17 which removes the RF carrier and produces a video DC signal over line 18 proportional to the amplitude of the sum signal.

In a similar manner, the phase-shifted signal and the original signal are also applied to a differencing circuit 19 where the difference between these RF signals is obtained, and the difference signal is also detected at 20 to provide a video or DC signal over line 21 proportional to the amplitude of the difference of these two signals. These sum and difference amplitude signals on lines 18 and 20 are then applied to a comparator circuit 22 which generates an output of one level, or binary one, if the sum exceeds the difference signal, and produces an output of a different level, or binary 0, if the difference signal exceeds the sum signal.

FIG. 2 illustrates the manner in which the binary output of line 10 provides a first digital representation of the frequency of the incoming signal within a given frequency range. Initially, presupposing that the delay line or cable 15 is of sufficient length to produce a 360° phase shift at a frequency $F_0$, then it is seen from the solid line curve 22, that illustrates the variation in amplitude of the sum signal with frequency, that the sum signal reaches a maximum at the frequency $F_0$. This results from the fact that a 360° phase displaced signal and the original signal are in phase coincidence and therefore their sum yields an amplitude that is twice as large as either one. On the other hand, if the incoming frequency were ½ $F_0$, then the phase shift produced by the cable would be only 180°, and the two component signals being summed would be out of phase and their summed amplitude would be at a null or 0 as illustrated by the curve 22 at frequency ½ $F_0$. Thus, it is seen that the amplitude of the sum signal (curve 22) varies from a minimum to a maximum over a range of frequency extending from ½ $F_0$ to $F_0$ and then declines to a minimum again as the frequency further increases to 1 ½ $F_0$ where the signals are again 180° out of phase. Additionally, it is observed that at each of the harmonic frequencies at 2 $F_0$, 3 F, and the like, the signals being summed are always in phase and hence the variation in the amplitude of the sum signal (curve 22) repeats itself for each harmonic frequency.

The amplitude of the difference signal, represented by dotted curve 23, behaves in just the opposite manner as does the sum signal. Thus at the given frequency $F_0$, the two signals are in phase coincidence and their difference in amplitude is a minimum or 0. On the other hand, at ½ $F_0$ or at 1 ½ $F_0$, or at any such odd harmonic, the two signals are 180° out of phase and hence their difference amplitude is a maximum.

Thus it is seen from the curves of 22 and 23 of FIG. 2, that a comparison of the relative amplitudes of the sum and difference signals can define the frequency of the incoming signal within a given range. In the example discussed above, when the output of the comparator 22 is a binary one (where the sum signal exceeds the difference) it is seen from these curves that the frequency lies within the range of ¾ $F_0$ to 1 ½ $F_0$, or any harmonic of this range, whereas when the output of comparator 22 is a binary 0 (where the difference exceeds the sum) the frequency lies within the range of ¼ $F_0$ to ¾ $F_0$ (or any harmonic of this range).

It is also noted from the curves of FIG. 2, that the amplitudes of the sum and difference signals become equal at the crossover points of ¾ $F_0$, 1 ¼ $F_0$ and at harmonics thereof, and therefore should the incoming frequency be at any one of these frequencies, an ambiguity can exist in the code as to whether the output is a binary 1 or a binary 0. To overcome this ambiguity, this channel provides a second digital comparison for distinguishing the frequency at these crossover frequencies.

Returning to FIG. 1, the incoming signal after passing through time delay 15 is also directed to a frequency insensitive phase translator 24 where the phase is displaced by minus 90°, and this resulting displaced signal is summed at 25 with the original signal obtained over line 14 and its amplitude is detected by detector 28. Similarly, an opposite fixed phase translation is provided by a translator 27 and the resulting 90° displaced signals are added by the sum circuit 26 and the resulting amplitudes detected by detector 29.

The result of this phase displaced processing of the incoming signal is to provide two additional amplitude curves 32 and 33 in FIG. 2, which have a similar variation in amplitude with frequency as do the curves 22 and 23 discussed above, but being angularly displaced therefrom. Thus at the frequencies of ¼ $F_0$, ¾ $F_0$, and others where ambiguity might exist, no such ambiguity exists in the second pair of curves, and one can determine from the greater of the two amplitudes in the second pair of curves whether the unknown frequency is at ¼ $F_0$ or ¾ $F_0$.

The effect of the second amplitude comparison for this channel is more clearly shown by the decision diagram in FIG. 3. In this diagram, the amplitude curves of FIG. 2 are simplified by showing only the greater of the amplitudes for each frequency range in the form of a block having a binary 0 in the block when the sum signal exceeds the difference, or where a given one of the 90° phase displaced signals exceeds the other displaced sum signals, and having a binary 1 in the block to indicate the opposite condition. Those regions separating the blocks and having a cross indicate the narrow frequency areas where the signals being compared in amplitude are approximately equal to one another and where a possible ambiguity in the code might occur. The upper horizontal series of blocks indicates the digit of the code generated at output line 11 for each different frequency range or sector as a result of comparing the 90° phase displaced signals, and the lower horizontal series of blocks indicate the digit of the code generated at output line 10 by comparing the sum and difference signals. As is illustrated below these two series of blocks, the combination of these two outputs is a two digit binary code that divides the bandwidth of frequencies extending from 0 frequency $F_0$ into four equal ranges, each of which is defined by a different two digit binary code. Thus, for example, where the unknown incoming frequency lies in the range of ½ $F_0$ to ¾ $F_0$, the output binary code produced is "01." On the other hand, where the incoming signal is in the range of 0 to ¼ $F_0$, the output code is "10," a as shown.

It will be noted that the output code repeats itself for each harmonic, and therefore the same output code exists for frequencies of ⅛ $F_0$ (code 10) as for the frequency 1 ⅛ $F_0$ (code 10). To identify the proper range, a band-pass filter 34 is used at the input to the channel as shown in FIG. 1, that will pass only the frequencies in one band, e.g., from 0 to $F_0$, or from $F_0$ to 2 $F_0$, or the like, whereby the output code identifies the unknown frequency as occurring in one of the four sectors or ranges of this particular band.

The two digit system, thus far described, divides the frequency bandwidth under observation into only four equal ranges and therefore its accuracy or resolution is limited to defining the incoming frequency as being within one of these four ranges. To double the number of ranges or to improve the resolution by a factor of two, it is only necessary to add one additional channel to the system as shown by the two-channel system in FIG. 4.

In FIG. 4, the second channel is substantially identical in construction and arrangement with the first channel and therefore the same circuits bear the same numbers as in the first channel but followed by the letter $a$. The only difference in the two channels is that the delay line or cable 37 used in the second channel is made electrically twice as long as that of the first channel and therefore produces a phase shift with frequency that is twice as great as that of the first channel. Using these two channels, a four-bit output code is produced that divides the frequency bandwidth into eight sectors and can therefore define the frequency of an incoming wave within a sector or band that is one-eighth of the bandwidth $F_0$.

In a similar manner, the addition of a third substantially identical channel (not shown) using a delay line or cable that is electrically twice as long as that of the second channel, and four times as long as the first channel, produces a six-bit output code that again doubles the definition and divides the frequency bandwidth into 16 equal ranges.

When more than one channel is used to obtain greater accuracy or resolution, it is not necessary to use all of the bits or digits produced and, in fact, it is desired to avoid using these digits that occur at the crossover points where the amplitudes of the signals being compared are substantially equal since the likelihood of error at these points is great. In a two-channel system, for example, only three of the four digits produced are needed to define the frequency within eight sectors, and in a three-channel system only four of the six digits produced are needed to define the frequency within 16 sectors. In these multichannels, therefore, certain ones of the digits are not used to avoid ambiguities.

As an example of the operation of a three-channel system, reference is made to the decision diagram of FIG. 5. In this diagram, the upper two horizontal rows of blocks, labeled bit No. 1 and bit No. 2 are produced at the two outputs of the first channel, the third horizontal row, labeled bit No. 3 is produced from the sum and difference comparison output of the second channel, and the last two horizontal rows, labeled bit No. 4 and Bit no. 5 are produced from the sum and difference amplitude comparison and the 90° displaced signal amplitude comparison, respectively, in the third channel. In this example, it is noted that sufficient information is obtained from five bits so that it is unnecessary to use the sixth bit, the 90° displaced signal comparison from the second channel, and therefore only bit 3 is used from this second channel. It is also noted in this decision diagram that the second channel uses a cable or delay line ($2\lambda_0$) that is twice as great as that of the first delay line, and the third channel uses a time delay line $4\lambda_0$ that is four times as long as that of the first channel.

As illustrated, this three-channel system using a total of only five bits enables the frequency band of 0 to $F_0$ to be divided into 16 equal sectors or ranges, and identifies the frequency of an incoming signal by using a total of only four of these five bits as will be shown below. If a fourth channel were added to the system, only the first and last of the channels would require the use of the 90° displaced signal comparisons since sufficiently redundant information would be obtained by using only one bit from each intermediate channel to double the resolution of the system over a three-channel system without the need for these additional bits.

The chart below shows the manner in which only four of the least ambiguous bits are used in a three-channel system to define the incoming frequency in one of the 16 sectors. As shown, for the minus 8 sector (frequency of 0 to 1/16 $F_0$), the first bit is not needed and only bits 2, 3, 4, and 5 are used to provide the code (−0110); for the minus 7 sector (range of 1/16 to ⅛ $F_0$), the third bit provides a possible ambiguity at the end of the range and therefore it can be eliminated by using only the first, second, fourth and fifth bits to provide the code (10–00). In a similar manner each of these 16 frequency sectors or ranges can be defined by a unique code of chosen ones of four bits, eliminating those bits that may be ambiguous at some part of the frequency range. It is noted that the fourth and fifth bits are always used since these provide the greatest accuracy or resolution, but that various ones of the first, second, and third bits may be eliminated or not used since the information therein is redundant.

EXHIBIT A

|     | \multicolumn{5}{c}{Sector Number—} |
| --- | --- | --- | --- | --- | --- |
|     | 1 | 2 | 4 | 4 | 5 |
| −8  |   |   | 0 | 1 | 0 |
| −7  | 1 | 0 |   | 0 | 0 |
| −6  | 1 | 0 |   | 0 | 1 |
| −5  | 1 |   | 0 | 1 | 1 |
| −4  | 1 |   | 0 | 1 | 0 |
| −3  | 1 | 1 |   | 0 | 0 |
| −2  | 1 | 1 |   | 0 | 1 |
| −1  |   | 1 | 1 | 1 | 1 |
| 1   |   | 1 | 1 | 1 | 0 |
| 2   | 0 | 1 |   | 0 | 0 |
| 3   | 0 | 1 |   | 0 | 1 |
| 4   | 0 |   | 0 | 1 | 1 |
| 5   | 0 |   | 0 | 1 | 0 |
| 6   | 0 | 0 |   | 0 | 0 |
| 7   | 0 | 0 |   | 0 | 1 |
| 8   |   | 0 | 1 | 1 | 1 |

As illustrated above in FIG. 3, the code repeats itself for each different bandwidth 0 to $F_0$, and therefore a band-pass filter may be used at the input of the system to limit the range of frequencies being considered to a known range covered by the bandwidth of the system. For example, if the system has a bandwidth of 40 megacycles, a band-pass filter 34 may be used to pass the range of 40 to 80 megacycles, or from 160 to 200 megacycles, or any other range covering this bandwidth. For detecting frequencies in different ranges, the filter 34 may be made adjustable, or additional filters operating in the different ranges desired may be substituted for the unit 34.

Alternatively, the bandwidth of the system itself may be changed since this is determined by the shortest time delay or cable provided in the system (channel 1). For example, if it is desired to double the bandwidth of the system, the first time delay is made one-half as long as originally. The reason for this occuring may be seen by returning to the diagram of FIG. 2. As observed in FIG. 2, the sum and difference amplitude lobes 22 and 23 repeat themselves for each harmonic of the bandwidth, due to the fact that for a delay line producing a 360° phase shift at one frequency, it produces a 720° phase shift at double the frequency, and the signal in both cases are in phase coincidence with one another. Consequently, as the frequency is doubled, the signals are in phase and the code repeats itself. On the other hand, if for the same frequency band of 0 to $F_0$, the delay line or cable is made only half as long (½ $\lambda_0$), the frequency $F_0$ produces only a 180° phase shift and it therefore requires twice the frequency band (or 0 to 2 $F_0$) to produce a 360° phase shift and complete the cycle. Consequently, where the delay line of the first channel is made shorter at the frequency range being considered, the bandwidth of the system is proportionally increased. On the other hand, the number of channels being used in any system determines the resolution or narrowest sector or frequency range into which this bandwidth is divided. Therefore if the system is designed for a greater bandwidth, a larger number of channels is needed to obtain the same resolution as a system designed for a smaller bandwidth.

The following tabulated chart illustrates the system parameters for a family of systems where the frequencies are expressed in megacycles (mc.) and the length of delay line cables using an air dielectric is expressed in centimeters (cm.). This chart tabulates the parameters for two seven-channel systems and sets forth the cable length required for each of the channels, the bandwidth in megacycles for each of the channels, the sector width or resolution for each of the channels, and the number of sectors or ranges produced.

As shown, for the first seven-channel system, the longest cable being used in 750 centimeters, and this results in a 10 megacycle sector width. The shortest cable in this system is 11.7 centimeters, and the shortest cable determines the system bandwidth, as discussed above, to be 2,560 megacycles. Thus, the shortest cable length determines the overall bandwidth of the system as being 2,560 megacycles, and the longest cable, 750 centimeters determines the system resolution to be 10 megacycles, so that an incoming signal anywhere in the bandwidth of 2,560 megacycles can be defined within a range of 10 megacycles.

If it is desired to increase the resolution or define the incoming signal within a smaller frequency range, the second seven-channel system tabulated below the first system, can be used. In this system the longest cable length is doubled to 1,500 centimeters and the shortest cable length lengthened to 23.4 centimeters. By lengthening the cable, or phase shift, the bandwidth of the system is reduced to 1,280 megacycles, but the resolution has been doubled to defining the frequency within a range of 5 mc. If it is desired to double the resolution of the system yet provide the same bandwidth, the second system will require an additional number of channels with the cable length for the shortest channel being 11.7 centimeters, as discussed above in the first example.

TABLE B

| | Bandwidth (mc.) | Number of Channels | Number of Sectors | Cable length (air dielectric) cm |
| --- | --- | --- | --- | --- |
| Sector width (mc.): | | | | |
| 10 | 40 | 1 | 4 | 750 |
| 10 | 80 | 2 | 8 | 375 |
| 10 | 160 | 3 | 16 | 187.5 |
| 10 | 320 | 4 | 32 | 93.75 |
| 10 | 640 | 5 | 64 | 46.875 |
| 10 | 1,280 | 6 | 128 | 23.4375 |
| 10 | 2,560 | 7 | 256 | 11.71875 |
| 5 | 20 | 1 | 4 | 1,500 |
| 5 | 40 | 2 | 8 | 750 |
| 5 | 80 | 3 | 16 | 375 |
| 5 | 160 | 4 | 32 | 187.5 |
| 5 | 320 | 5 | 64 | 93.75 |
| 5 | 640 | 6 | 128 | 46.875 |
| 5 | 1,280 | 7 | 256 | 23.4375 |

This 10 megacycle system illustrated in the first group of tabulated numbers above is useable over a 2,560 megacycle span anywhere in the frequency band. Since the codes repeat themselves every 2,560 megacycles, the proper band-pass filter 34 is simply put on the front end of the system to insure rejection of any of the bands that are not desired.

As is believed now evident, the frequency detecting system of the present invention is capable of many changes and variations. The system is preferably constructed with each channel packaged in modular form, and containing the elements and circuits of FIG. 1, differing only by the electrical length of the time delay line or cable, so that a desired number of such channels may be variously combined to provide the bandwidth and resolution to meet the needs of a particular system. The system may be also used for frequencies outside the RF bands such as at sonic, subsonic and supersonic frequencies and others. The circuitry for the sum and difference networks, time delays and detectors will also vary depending upon the frequency band and spectrum being detected At microwave frequencies, conventional hybrid networks may be used to obtain the sum and difference components, and ordinary cable of varying lengths to provide the frequency sensitive phase shifts. Similarly at other lower frequencies, the use of transformer sum and difference networks are well known as are the other circuitry needed. In Applicant's copending application Ser. No. 501,231, filed Oct. 22, 1965, there is also described detectors and comparator circuits that may be used.

The output digital code being generated may be displayed on an indicator or a series of indicators, or may be recorded, stored, and processed by computers. In the above-mentioned copending application there is provided a digital system for detecting the direction of incoming waves and pulses and provided with a matrix and indicator system for immediately displaying the digital output. A similar matrix and display system may be used in connection with the present invention, as may other well-known systems.

What is claimed is:

1. A frequency measuring system for directly providing a digital indication of frequency comprising: time delay means responsive to an incoming signal whose frequency is to be determined for phase shifting said signal in proportion to frequency, means for obtaining the sum and difference of said phase-shifted signal and said incoming signal, means for comparing the amplitude of said sum and difference signals and producing a digital indication of one kind if the sum exceeds the difference and a digital indication of another kind if the difference exceeds the sum, and resolution improving means for resolving any ambiguity in the code at frequencies where the amplitude of the sum signal and difference signals are close to one another.

2. In the system of claim 1, said resolution improving means including a frequency insensitive phase displacement means for displacing the phase of one of said incoming signal and phase-shifted signal and summing said displaced signal with the remaining signal to provide a second sum signal, and oppositely displacing the phase of one of said incoming signal and phase-shifted signal and summing said oppositely displaced signal and the remaining signal to provide a third sum signal, and means for comparing the amplitude of said second sum signal and third sum signal and producing a digital indication representing that one of the second and third sum signals that exceeds the other.

3. In the system of claim 1, an additional frequency sensitive time delay means for shifting said incoming signal in proportion to its frequency by a greater phase shift than said first time delay means, means for obtaining the sum and difference of said additional phase-shifted signal and said incoming signal, and means for comparing the amplitude of said latter-mentioned sum and difference signal and providing a digital indication representing the greater of said last-mentioned amplitudes.

4. A modular system as in claim 1, comprising: a plurality of channels, each channel having a progressively greater frequency sensitive time delay means for phase shifting said incoming signal in proportion to frequency by a greater phase shift than in the preceding channel, means in each channel for obtaining the sum and difference of the phase-shifted signal therein and the incoming signal, and means in each channel for comparing the amplitude of the sum and difference signals and producing a digital indication representing the greater of said amplitudes.

5. In the system of claim 1, said means for comparing the amplitude of said sum and difference signals comprising means for detecting said sum signal to provide a DC sum signal, means for detecting the difference signal to provide a DC difference signal, and a comparator responsive to said DC sum signal and DC difference signal to provide a given output if the DC sum signal exceeds the DC difference signal and a second given output if the DC difference signal exceeds the DC sum signal.

6. In the system of claim 1, said resolution improving means including means for phase displacing said input signal with respect to said phase-shifted signal by 90° at all frequencies, means for summing said resulting phase displaced signal and remaining signal to produce a first resolution signal, means for phase dipslacing said input signal with respect to said phase-shifted signal by a minus of 90° a tall frequencies, means for summing said last-mentioned phase displaced signal and remaining signal to produce a second resolution signal, and means for comparing the amplitudes of said first and second resolution signals and producing a digital indication of the greater amplitude.

7. A method of digitally determining the frequency of an incoming signal by comparing the amplitudes of processed signals comprising the steps of: producing a series of differently phase-shifted signals, each being variably phase shifted by an amount proportional to the frequency of the incoming signal, separately combining each variably phase-shifted signal with the incoming signal to provide a pair of signals proportional to the sum and difference thereof, and comparing the amplitudes of each pair of sum and difference signals and producing a binary zero indication if one of said pair exceeds the other and a binary 1 indication for the opposite condition, and additionally processing one of said phase-shifted signals and said incoming signal to resolve ambiguity where the amplitude of the sum signal is close to the amplitude of the difference signal.

* * * * *